(12) United States Patent
Karam et al.

(10) Patent No.: US 9,915,201 B2
(45) Date of Patent: Mar. 13, 2018

(54) AIRCRAFT POWER SYSTEM (71) Applicant: Rolls-Royce Corporation, Indianapolis, IN (US)

(72) Inventors: Michael Abraham Karam, Plainfield, IN (US); Craig Heathco, Greenwood, IN (US); Andrew Eifert, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1026 days.

(21) Appl. No.: 14/140,959

(22) Filed: Dec. 26, 2013

(65) Prior Publication Data

US 2014/0248121 A1 Sep. 4, 2014

Related U.S. Application Data (60) Provisional application No. 61/772,272, filed on Mar. 4, 2013.

(51) Int. Cl.
*F02C 6/16* (2006.01)
*F02C 7/045* (2006.01)
(Continued)

(52) U.S. Cl.
CPC .............. *F02C 7/045* (2013.01); *F02C 3/13* (2013.01); *F02C 3/305* (2013.01); *F02C 6/14* (2013.01);
(Continued)

(58) Field of Classification Search
CPC .... F02C 1/02; F02C 3/13; F02C 3/305; F02C 6/04; F02C 6/06; F02C 6/08; F02C 6/14; F02C 6/16; F02C 9/18; F02C 9/50; F02C 9/52; F02C 7/26; F02C 7/262; F02C 7/27; F02K 3/12; F05B 2260/42; F05B 2270/103; F05B 2270/1031; F05B 2270/1073; F05B 2270/111; F05B 2270/1033;
(Continued)

(56) References Cited

U.S. PATENT DOCUMENTS 3,092,964 A 6/1963 Martin et al.
3,434,281 A 3/1969 Donaldson
(Continued)

OTHER PUBLICATIONS

International Search Report and Written Opinion, dated Nov. 7, 2014, for corresponding International Patent Application No. PCT/US2014/016859, filed Feb. 18, 2014.
(Continued)

*Primary Examiner* — Gerald L Sung
*Assistant Examiner* — Scott Walthour
(74) *Attorney, Agent, or Firm* — Barnes & Thornburg LLP (57) ABSTRACT A gas turbine engine is disclosed which includes a bypass passage that in some embodiments are capable of being configured to act as a resonance space. The resonance space can be used to attenuate/accentuate/etc a noise produced elsewhere. The bypass passage can be configured in a number of ways to form the resonance space. For example, the space can have any variety of geometries, configurations, etc. In one non-limiting form the resonance space can attenuate a noise forward of the bypass duct. In another non-limiting form the resonance space can attenuate a noise aft of the bypass duct. Any number of variations is possible.

10 Claims, 5 Drawing Sheets (51) Int. Cl.
*F02C 3/13* (2006.01)
*F02C 6/14* (2006.01)
*F02C 7/27* (2006.01)
*F02K 3/12* (2006.01)
*F02C 3/30* (2006.01)
*F02C 6/08* (2006.01)
*F02C 6/04* (2006.01)
*F02C 9/18* (2006.01)
*F02C 7/262* (2006.01)
*F02C 9/52* (2006.01)
*F02C 1/02* (2006.01)
*F02C 6/06* (2006.01)
*F02C 7/26* (2006.01)
*F02C 9/50* (2006.01)

(52) U.S. Cl.
CPC .................. *F02C 6/16* (2013.01); *F02C 7/27* (2013.01); *F02K 3/12* (2013.01); *F02C 1/02* (2013.01); *F02C 6/04* (2013.01); *F02C 6/06* (2013.01); *F02C 6/08* (2013.01); *F02C 7/26* (2013.01); *F02C 7/262* (2013.01); *F02C 9/18* (2013.01); *F02C 9/50* (2013.01); *F02C 9/52* (2013.01); *F05B 2260/42* (2013.01); *F05B 2270/103* (2013.01); *F05B 2270/1031* (2013.01); *F05B 2270/1033* (2013.01); *F05B 2270/1073* (2013.01); *F05B 2270/111* (2013.01); *F05D 2260/42* (2013.01); *F05D 2260/963* (2013.01); *F05D 2270/05* (2013.01); *F05D 2270/051* (2013.01); *F05D 2270/093* (2013.01); *F05D 2270/13* (2013.01); *F05D 2270/3061* (2013.01)

(58) Field of Classification Search
CPC ............ F05D 2260/42; F05D 2270/05; F05D 2270/051; F05D 2270/093; F05D 2270/13; F05D 2270/3061
See application file for complete search history.

(56) References Cited

U.S. PATENT DOCUMENTS

| | | | |
|---|---|---|---|
| 3,518,023 A | 6/1970 | Britten et al. | |
| 3,811,273 A * | 5/1974 | Martin | B64D 31/12 60/224 |
| 3,831,373 A | 8/1974 | Flynt | |
| 4,777,793 A | 10/1988 | Weigand et al. | |
| 4,815,277 A | 3/1989 | Vershure, Jr. et al. | |
| 4,979,362 A | 12/1990 | Versure, Jr. et al. | |
| 5,097,658 A * | 3/1992 | Klaass | F02C 7/277 60/39.27 |
| 5,097,659 A | 3/1992 | Lampe et al. | |
| 5,136,838 A | 8/1992 | Shekleton et al. | |
| 6,316,841 B1 | 11/2001 | Weber | |
| 6,474,069 B1 * | 11/2002 | Smith | F01K 23/106 60/39.182 |
| 6,519,944 B2 | 2/2003 | Smith | |
| 7,000,399 B2 | 2/2006 | Iles et al. | |
| 7,104,499 B1 * | 9/2006 | Arata | B64C 9/38 244/12.3 |
| 2005/0252375 A1 | 11/2005 | Iles | |
| 2006/0042261 A1 * | 3/2006 | Taware | F23N 5/003 60/773 |
| 2008/0178601 A1 | 7/2008 | Nakhamkin | |
| 2009/0071119 A1 * | 3/2009 | Kervistin | F02C 7/232 60/39.094 |
| 2009/0077946 A1 | 3/2009 | Ishiba | |
| 2009/0166358 A1 * | 7/2009 | Bose | B01D 53/24 220/88.3 |
| 2013/0040545 A1 * | 2/2013 | Finney | B64D 13/06 454/71 |

OTHER PUBLICATIONS

International Search Report and Written Opinion, International Application No. PCT/US2014/016859, search completed Oct. 31, 2014, 12 pages.

European Office Action issued in connection with European Application No. 14766241.5-1607, dated Mar. 23, 2017, 5 pages.

* cited by examiner

AIRCRAFT POWER SYSTEM

CROSS-REFERENCE TO RELATED APPLICATIONS

This application claims priority to U.S. Provisional Application Ser. No. 61/772,272, entitled "Aircraft Power System," filed Mar. 4, 2013, which is incorporated herein by reference in its entirety.

TECHNICAL FIELD

The present invention generally relates to gas turbine engine passages, and more particularly, but not exclusively, to configurable bypass passages of gas turbine engines.

BACKGROUND

Providing power assist to a multi-engine aircraft experiencing engine troubles remains an area of interest. Some existing systems have various shortcomings relative to certain applications. Accordingly, there remains a need for further contributions in this area of technology.

SUMMARY

One embodiment of the present invention is a unique aircraft power system. Other embodiments include apparatuses, systems, devices, hardware, methods, and combinations for increasing power in an aircraft engine. Further embodiments, forms, features, aspects, benefits, and advantages of the present application shall become apparent from the description and figures provided herewith.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
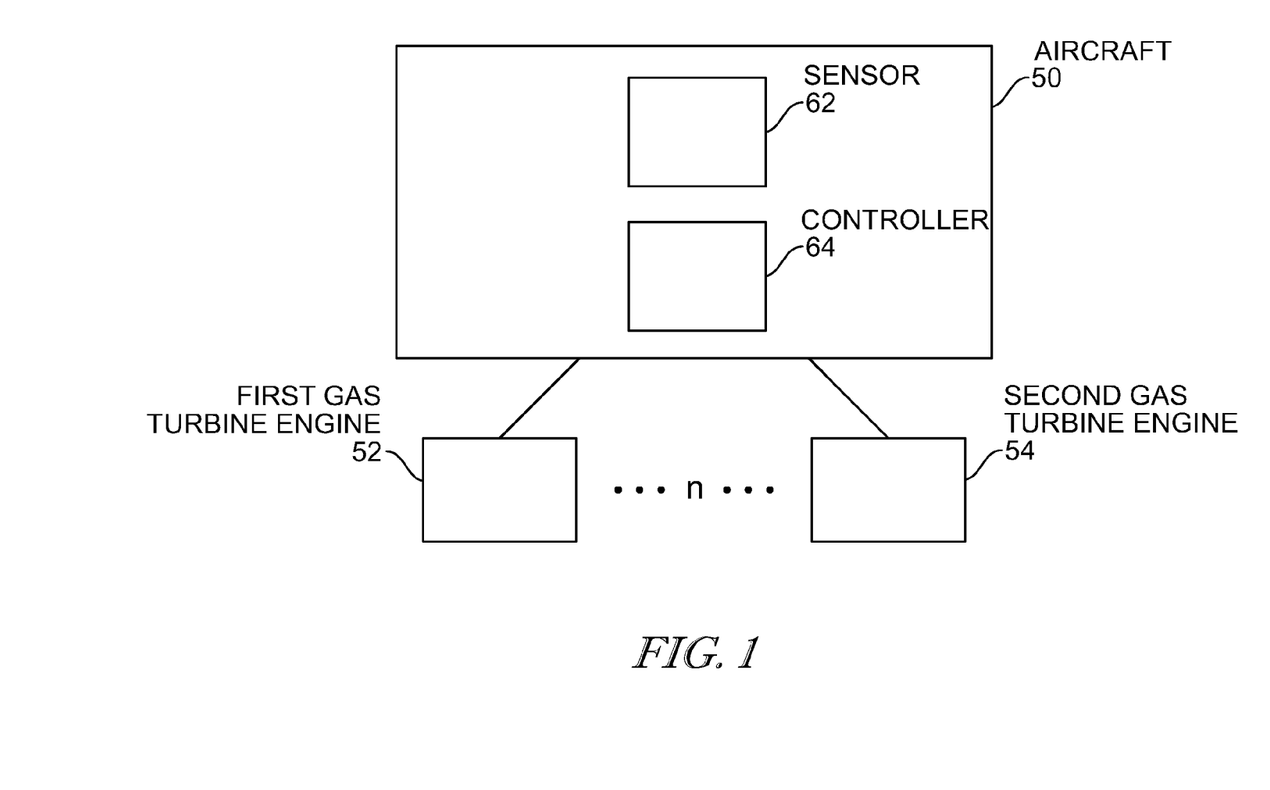
FIG. 1 depicts one embodiment of an aircraft.
Figure 2:
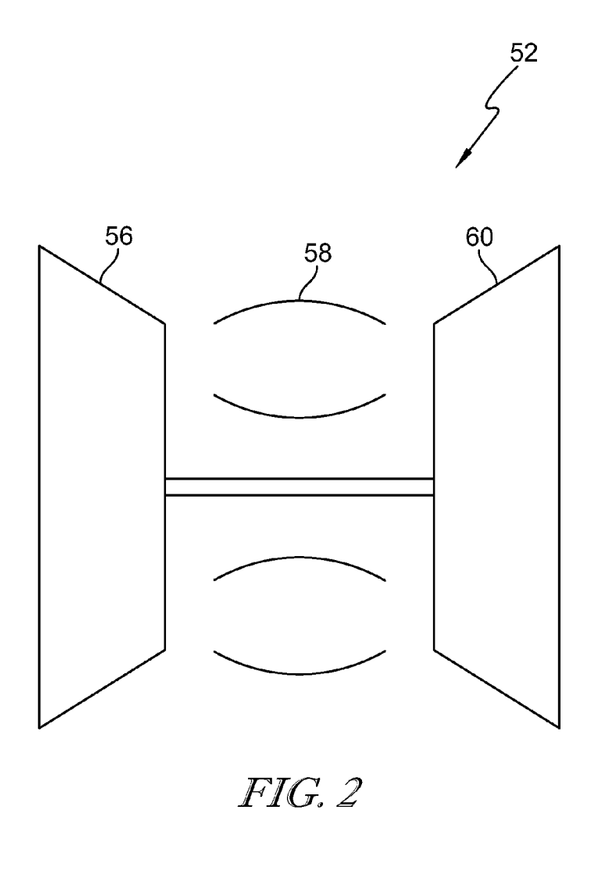
FIG. 2 depicts one embodiment of a gas turbine engine.

With reference to FIGS. 1 and 2, an aircraft 50 is depicted having a first aircraft engine 52 and a second aircraft engine 54, though in some embodiments the aircraft 50 can include any number of other engines as shown by the "n" designation indicating any additional number. The aircraft engines 52 and 54 are used to provide power to the aircraft and in one form are used to provide forward motive force to the aircraft 50 such as to achieve or maintain a flight condition. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles.

The aircraft engines 52 and 54 can take any variety of forms. In some embodiments the aircraft engines 52 and 54 are the same, but in other embodiments the engines 52 and 54 can be different and/or can perform different functions. To set forth just a few non-limiting examples of the forms that either or both of the engines 52 and 54 can take, reference is made to one embodiment of aircraft engine 52.

The illustrative embodiment in FIG. 2 depicts aircraft engine 52 as a gas turbine engine and is shown including a compressor 56 for compressing an air, a combustor 58 for burning a mixture of fuel and the compressed air, and a turbine 60 used to expand the combusted mixture of fuel and air. Though the gas turbine engine 52 is shown as a single spool turbojet engine, other embodiments can include additional numbers of spools and can take other forms such as turbofan, turboprop, or turboshaft. In some embodiments the gas turbine engine 52 can be an adaptive cycle and/or variable cycle engine. It is contemplated that the engine 52 can have other variations and forms other than the few listed above.

The aircraft 50 is capable of operating at a variety of speeds and can include a sensor 62 and controller 64. The sensor 62 can be used in a variety of settings for a variety of purposes. In one form the sensor 62 measures aircraft flight condition such as speed and altitude, to set forth just two non-limiting examples, and can output any variety of data whether sensed or calculated. For example, the sensor 62 can sense and output conditions such as static temperature, static pressure, total temperature, and/or total pressure, among possible others. In addition, the flight condition sensor 62 can output calculated values such as, but not limited to, equivalent airspeed, altitude, and Mach number. Any number of other sensed conditions or calculated values can also be output. The flight condition sensor 62 provides data to the controller 64 and can output values in either analog or digital form.

The sensor 62 can alternatively and/or additionally be used to monitor any or all of the engine's health, status, and performance. Such a sensor can be coupled with the gas turbine engine 52 and can provide information, whether sensed or calculated, to the controller 64.

The controller 64 is provided to monitor and/or control engine operations and can be capable of interacting with an operator such as a pilot. The controller 64 can be comprised of digital circuitry, analog circuitry, or a hybrid combination of both of these types. Also, the controller 64 can be programmable, an integrated state machine, or a hybrid combination thereof. The controller 64 can include one or more Arithmetic Logic Units (ALUs), Central Processing Units (CPUs), memories, limiters, conditioners, filters, format converters, or the like which are not shown to preserve clarity. In one form, the controller 64 is of a programmable variety that executes algorithms and processes data in accordance with operating logic that is defined by programming instructions (such as software or firmware). Alternatively or additionally, operating logic for the controller 64 can be at least partially defined by hardwired logic or other hardware. In one particular form, the controller 64 is configured to operate as a Full Authority Digital Engine Control (FADEC); however, in other embodiments it may be organized/configured in a different manner as would occur to those skilled in the art. It should be appreciated that controller 64 can be exclusively dedicated to controlling operation of one or more of the aircraft engines, or may additionally and/or alternatively be used in the regulation/control/activation of one or more other subsystems or aspects of the aircraft 50, some embodiments of which are described further below.

Figure 3:
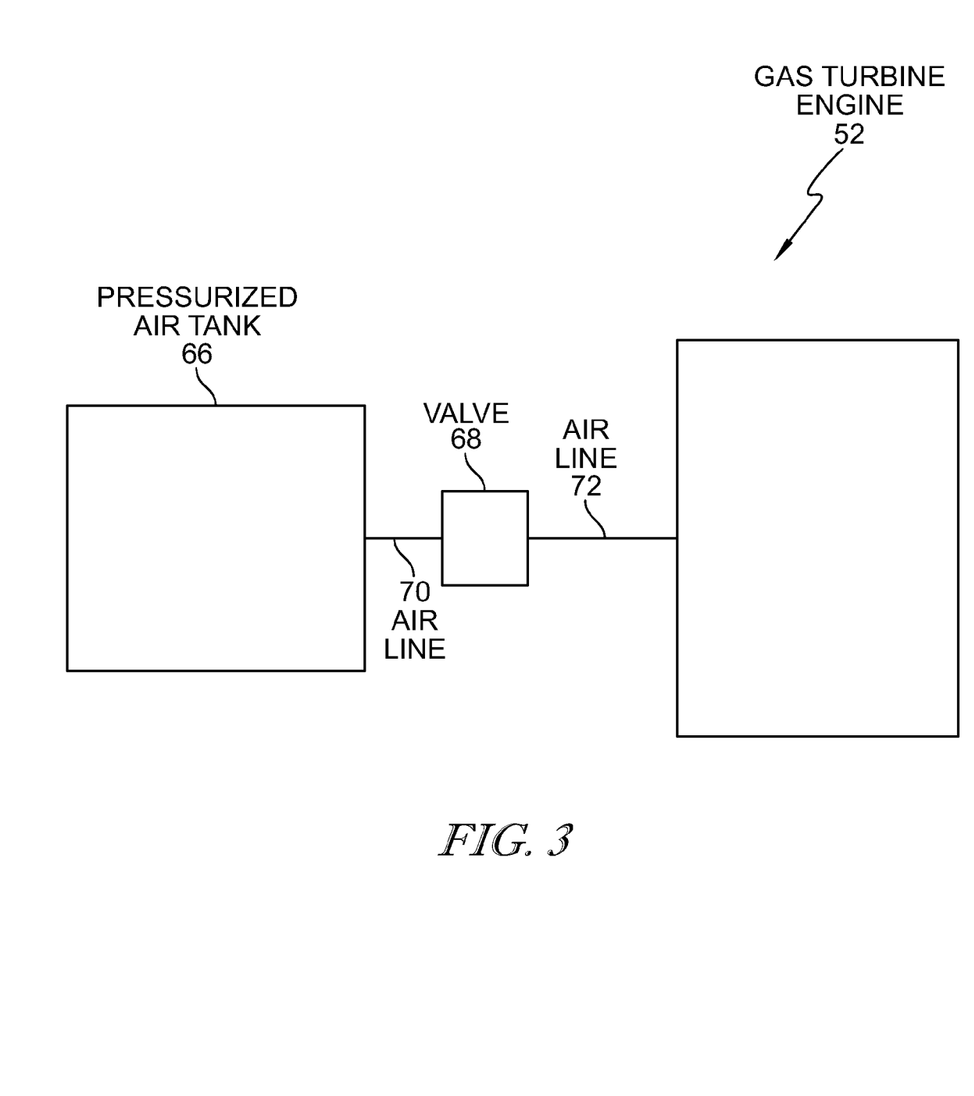
FIG. 3 depicts one embodiment of a gas turbine engine and air tank.

Turning now to FIG. 3, the aircraft 50 can include a pressurized air tank 66 capable of providing a pressurized air to one or more locations of the aircraft 50 and/or of the gas turbine engine 52. As used herein, the term "air" can be any suitable fluid which may or may not have the elemental composition of air. In one embodiment the pressurized air from the air tank 66 can be used to provide pressurized air to a gas turbine engine 52 to provide a power boost to the engine 52 as will be described further below. The air tank 66 is capable of being pressurized to a variety of pressures and can be any size and/or shape and have a variety of constructions. More than one tank 66 can be provided in any embodiment. The air tank 66 is capable of being charged with pressurized air while installed on the aircraft 50 or can be removed for servicing from the aircraft 50. In some forms the air tank 66 can be charged using one or more of the aircraft engines but it is contemplated that the air tank 66 can be recharged using another source either on or off the aircraft 50. In one embodiment the gas turbine engine 52 is used to charge the air tank 66. The air tank 66 can be recharged in flight in some modes of operation and can be recharged while the aircraft 66 is on the ground in others.

As depicted in the illustrative embodiment, a valve 68 is disposed between the compressed air in the air tank 66 and the gas turbine engine 52. An air line 70 can be disposed between the air tank 66 and the valve 68, as well as another air line 72 between the valve 68 and the gas turbine engine 52. In some embodiments, the valve 68 may be connected with the tank 66 such that an intermediate air line 70 is not needed. In some embodiments multiple air lines can be connected between multiple valves 68 to couple the air tank 66 to the one or more aircraft engines. For example, the air tank 66 can be coupled via one or more valves to both the engine 52 and engine 54. The multiple valves 68 can be connected directly to the air tank 66 or can be connected with multiple air lines. In still other embodiments, more than one air tank 66 can be provided in the aircraft 50.

The valve 68 can take on a variety of forms and can be actuated using a variety of techniques. To set forth just a few examples, the valve 68 can be driven or powered by devices that are mechanical, hydraulic, manual, electrical, electro-mechanical, or combinations thereof. The valve 68 can be arranged to have only two positions, open or closed, or can be a valve that provides any number of intermediate positions. In addition, the valve 68 can be capable of being commanded to any given position at a common rate in some embodiments and a variety of rates in others. Any variety of flow rates of the pressurized air can be provided through the valve 68. The valve 68 can be a one-time use valve or can be actuated a number of times to different positions. To set forth just a few further examples of variations, the valve 68 can be a ball valve, butterfly valve, check valve, gate valve, needle valve, piston valve, spool valve, or a poppet valve. In some forms the valve 68 can act as a pressure regulator. More than one valve 68 can be provided to admit pressurized air from the air tank 66 to the gas turbine engine 52, in which case the valves 68 can be, but need not be, the same. In embodiments of the aircraft 50 in which multiple valves 68 are used with multiple air tanks 66, not all valves 68 need be the same.

The valve 68 can be controlled by the controller 64. In one embodiment the controller 64 is capable of providing a signal to open the valve 68. The controller 64 can be used in some embodiments to control the rate at which the valve 68 is opened and/or the position to which the valve 68 is opened. In some embodiments the controller 64 is capable of controlling the valve 68 at any variety of positions between an open and closed position. The controller 64 can provide a signal to open and/or close the valve 68 based upon a request received from an operator, such as through a switch located in a cockpit, to set forth just one non-limiting example. In still other embodiments a switch can directly command the valve 68 without the need of the controller 64. In some embodiments, the controller 64 can monitor an aircraft engine and depending on a control algorithm provide signals to the valve 68. To set forth just one non-limiting example, the controller 64 can monitor whether an aircraft engine is providing sufficient propulsive power in light of a commanded performance and, if not sufficient, provide a signal to an appropriate valve 68, whether related to that particular engine or another engine, to open and/or close the valve. Other situations could also give rise to the valve 68 opening and admitting pressurized air to one of the aircraft engines.

When the aircraft 50 is being operated and a power boost is desired, pressurized air can be provided from the air tank 66 to one of the engines to increase a power from that engine. A power boost may be desired when one or more aircraft engines is inoperative and suffering power production problems. For example, one or more engines could experience a condition ranging anywhere from degraded performance to total engine failure such as might be experienced by mechanical or system failures, among other possibilities. The air tank 66 can be used to provide an increase in mass flow in one of the aircraft engines and can also be used to reduce a temperature of an airflow entering a portion of one of the engines, such as an airflow entering the combustor 58 of the engine 52. Consequently, when a temperature of a hot section of the engine 52 is reduced below a desired temperature and/or a temperature limit for a given fuel flow, the fuel flow can be increased to increase the power and increase the temperature to the desired temperature, a temperature closer to the desired temperature, or to a temperature limit.

In the case of multi-engine aircraft, the command to flow working fluid from the air tank 66 can be to all the engines or to a subset of the engines. For example, the command to the valve 68 can be to a remaining, otherwise healthy engine(s). In other situations if called for the command could alternatively and/or additionally be to the unhealthy engine. The controller 64 can be integrated with a pilot station such that the controller alerts the pilot to a discrepancy between an actual and commanded performance and awaits a command from the pilot to operate the valve 68. In other situations the controller can automatically operate the valve 68 prior to command and/or confirmation from the pilot. In these situations an alert can be provided to the cockpit to notify the crew of the automatic engagement of the system.

Figure 4:
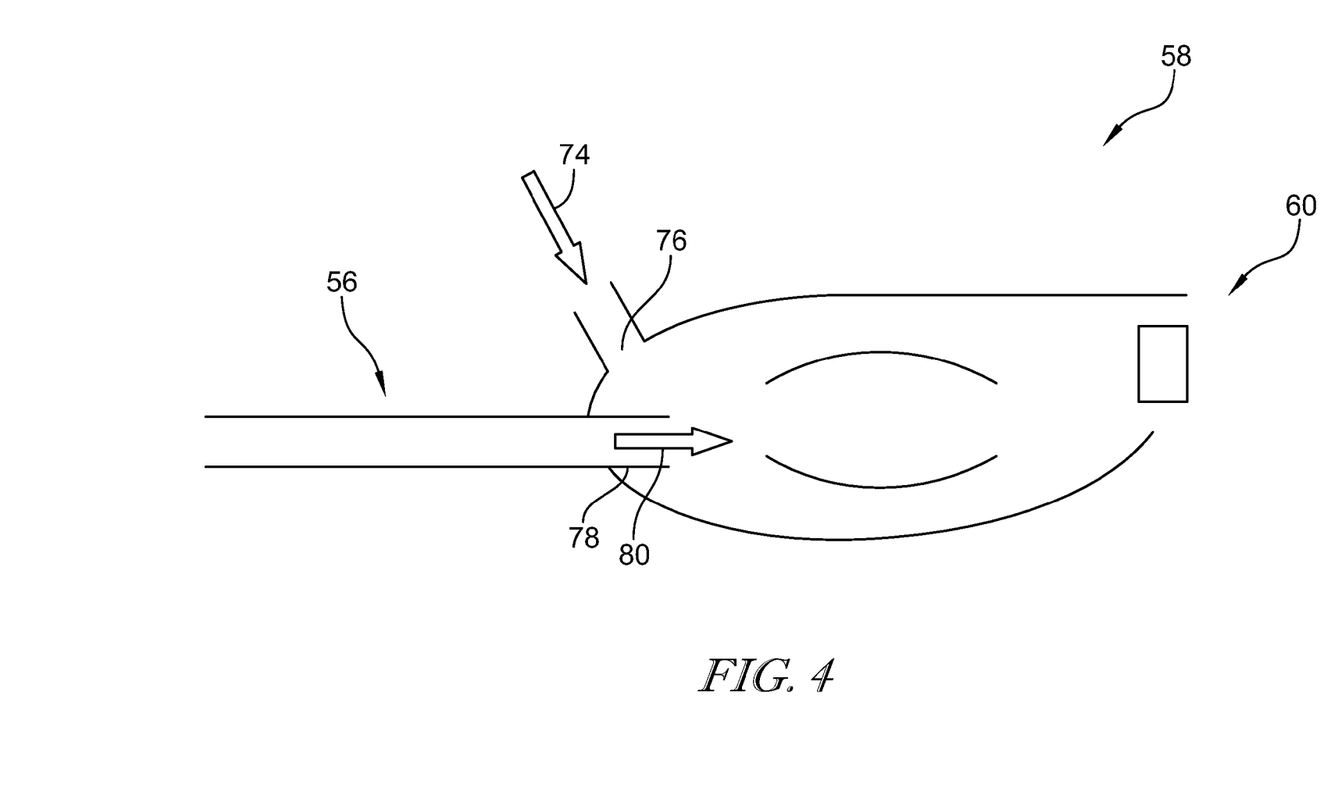
FIG. 4 depicts one embodiment of a gas turbine engine.

Turning now to FIG. 4, one embodiment of the gas turbine engine 52 is shown in which a pressurized air 74 is shown entering the combustor 58 via an opening 76. The pressurized air 74 can originate from the air tank 66. The illustrative embodiment depicts a diffuser 78 extending from the compressor 56, entering an area of the combustor 58, and discharging a compressed air 80 at a location axially aft of the opening 76. Different embodiments may have other combinations and orientations of the combustor 58, diffuser 78, and opening 76. To set forth one non-limiting example, the opening 76 can admit pressurized air 74 at a variety of locations in the combustor 58 in other embodiments. In other non-limiting example, some embodiments may not include all of the components depicted in FIG. 4, such as the diffuser 78. The opening 76 can take the form of one or more openings arranged around the gas turbine engine 52 and can be sized to pass the pressurized air 74 at a variety of flow rates, temperatures, and pressures.

Figure 5:
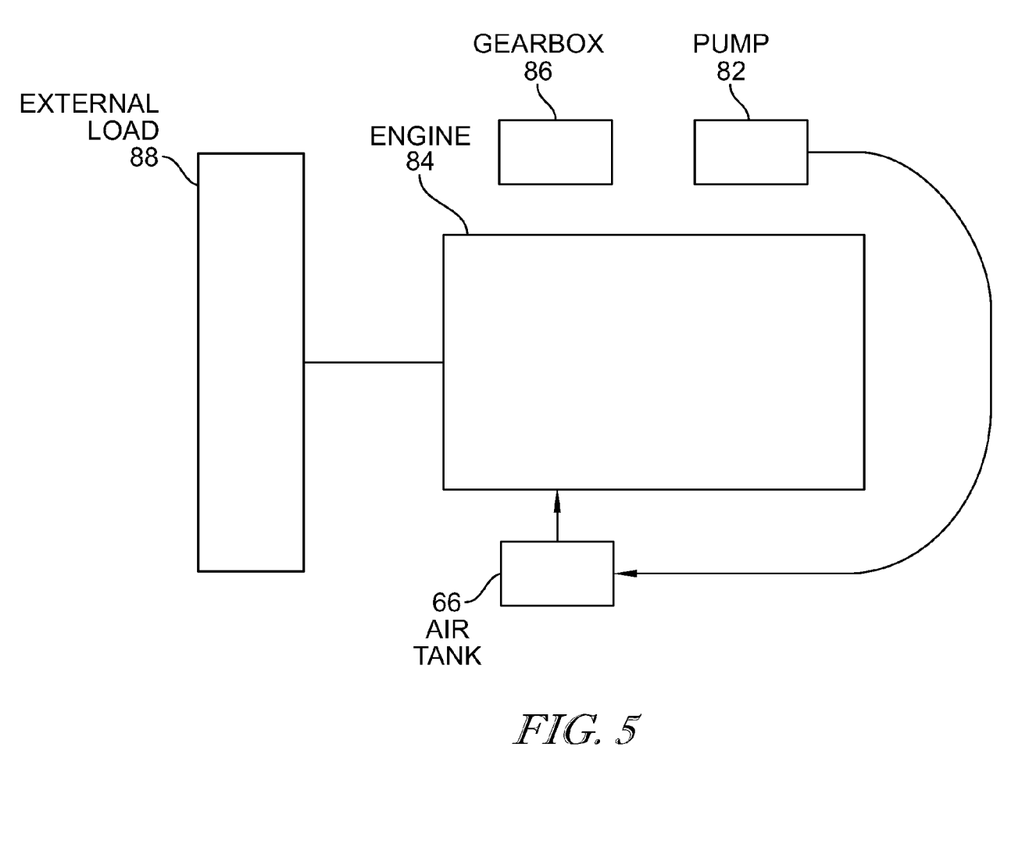
FIG. 5 depicts one embodiment of an engine, pump, and air tank.

Turning now to FIG. 5, one form of the present application is shown in which the air tank 66 can be recharged. In the illustrative embodiment the air tank 66 is configured to be pressurized by a pump 82 driven by an engine 84. In some embodiments, a gearbox 86 can be provided to convey power from the engine 84 to drive the pump 82. The pump 82 can take any variety of forms such as centrifugal pumps, axial pumps, screw pumps, gear pumps, lobe pumps, vane pumps, piston pumps, diaphragm pumps, and plunger type pumps, to set forth just a few non-limiting examples. The pump 82 can be mechanically driven in some embodiments, but in others the pump 82 can be a hydraulic, electrical, or pneumatic driven pump. More than one pump 82 can be used for the air tank 66. A pump 82 can be used to charge more than one tank 66, in which case some embodiments may include a valve to select between the tanks 66. The engine 84 can be one of the aircraft engines 52 and 54, or another engine either coupled with the aircraft 50 or with ground servicing equipment. In some forms both engines 52 and 54 can be used to power the pump 82 to pressurize the air tank 66. The gearbox 86 can be any suitable device to provide speed and/or torque conversion from the engine 84 to the pump and in one form is an accessory gearbox. It is contemplated that the gearbox 86 can include any variety of mechanisms such as clutches, to set forth just non-limiting variation. In some embodiments the pump 82 can be driven by an electric motor powered by a generator, whether driven by the engine 84 or another device. In the illustrative embodiment the engine 84 drives an external load 88 which can represent a propeller or a rotor, to set forth just two non-limiting examples. Some embodiments need not include an external load 88.

One aspect of the instant application provides an apparatus comprising a multi-engine aircraft including a first engine and a gas turbine engine having a compressor, combustor, and turbine, a source of compressed working fluid coupled with the aircraft and operable to dispense the compressed working fluid to the gas turbine engine, a valve coupled with the source of compressed working fluid and operable to permit passage of the compressed working fluid to a combustor of the gas turbine engine when the valve is operated, and wherein the valve is actuated to increase a mass flow through the gas turbine engine to boost its power during operation of the gas turbine engine.

A feature of the present application further includes a controller structured to actuate the valve when the first engine fails to provide a commanded level of thrust, and wherein the compressed working fluid is air.

Another feature of the present application provides wherein the controller is structured to actuate the valve after receiving a signal from a pilot interface.

Yet another feature of the present application provides wherein the controller is operable to affect a delivery of a first quantity of fuel to be burned in the combustor of the gas turbine engine after the valve is actuated in an amount greater than a second amount of fuel to be burned in the combustor before the valve is actuated.

Still yet another feature of the present application provides wherein the source of compressed working fluid is a pressurized tank.

A further feature of the present application provides wherein the pressurized tank is capable of being charged with a pump that provides working fluid to the tank, the pump powered by operation of the multi-engine aircraft.

A yet further feature of the present application provides wherein the pressurized tank receives working fluid from the gas turbine engine.

Another aspect of the instant application provides an apparatus comprising an aircraft having a first engine and a second engine, the first engine operating to produce a power for the aircraft by combusting a mixture of a compressed working fluid and a fuel, and an engine power supplement device to enable a relative increase in production in power from the first engine, the device including a vessel having a relatively compressed supplement fluid for the first engine when the second engine is in a degraded operating state, the engine power supplement device providing the relatively compressed supplement fluid to the first engine to supplement the compressed working fluid.

A feature of the present application provides wherein the relatively compressed supplement fluid is air and which further includes a pump operable to pressurize the air to create the relatively compressed supplement fluid and convey the relatively compressed supplement fluid toward the vessel.

Another feature of the present application provides wherein the pump is configured to be driven via a gearing powered from the aircraft.

Yet another feature of the present application provides wherein the gearing is driven by one of the first engine and second engine.

Still yet another feature of the present application provides wherein the aircraft includes a flow path from the vessel to the first engine, the flow path providing the relatively compressed supplement fluid to a combustor in which the mixture of a compressed working fluid and a fuel is combusted.

A further feature of the present application provides wherein the first engine includes a port in an axially forward portion of the combustor.

Yet another aspect of the instant application provides an apparatus comprising an aircraft having a plurality of engines producing propulsive force, and emergency mass flow means for increasing propulsive force from one of the plurality of engines when another of the plurality of engines is inoperative.

Still another aspect of the instant application provides a method comprising operating a first aircraft engine and a second aircraft engine to produce propulsive thrust to power an aircraft to a flight condition, as a result of a degraded performance of the first aircraft engine during a portion of the operating, actuating a valve to open a flow path from a relatively pressurized vessel on board the aircraft, conveying a fluid from the relatively pressurized vessel, and producing a propulsive thrust increase from the second aircraft engine as a result of the conveying the fluid.

A feature of the present application further includes charging the relatively pressurized vessel using at least one of the first aircraft engine and the second aircraft engine. Another feature of the present application further includes powering a pump to recharge the vessel.

Yet another feature of the present application further includes mechanically powering the pump via a gearing driven from at least one of the first aircraft engine and the second aircraft engine, and wherein the fluid is air.

Still another feature of the present application further includes introducing the fluid into a compressor of the second aircraft engine.

A further feature of the present application further includes monitoring an engine of the aircraft and detecting a degraded performance condition.

Yet another feature of the present application further includes as a result of the monitoring providing a command to produce the actuating the valve. While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
   operating a first aircraft engine and a second aircraft engine to produce propulsive thrust to power a multi-engine aircraft to a flight condition, the second aircraft engine being a gas turbine engine having a compressor, combustor, and turbine;
   actuating a valve to open a flow path from a source of compressed working fluid on board the multi-engine aircraft to permit passage of a compressed working fluid from the source of compressed working fluid to the combustor of the gas turbine engine as a result of a degraded performance of the first aircraft engine during a portion of the operating, the source of compressed working fluid being a pressurized tank;
   conveying the compressed working fluid, the compressed working fluid being air, from the source of compressed working fluid to the combustor of the gas turbine engine; and
   producing a propulsive thrust increase from the second aircraft engine as a result of the conveying the fluid;
   wherein the multi-engine aircraft includes a controller structured to actuate the valve in response to the first aircraft engine failing to provide a commanded level of thrust as a result of the degraded performance of the first aircraft engine; and
   wherein a pump provides the compressed working fluid to the pressurized tank, the pump being driven via a gearing powered by the gas turbine engine.

2. The method of claim 1, further comprising introducing the compressed working fluid into the compressor of the gas turbine engine.

3. The method of claim 2, further comprising monitoring the first aircraft engine and detecting the degraded performance of the first aircraft engine.

4. The method of claim 3, wherein the actuating the valve in response to the degraded performance comprises the controller commanding the valve to be actuated when the monitoring detects the degraded performance.

5. An apparatus comprising:
   a multi-engine aircraft including a first engine and a gas turbine engine having a compressor, combustor, and turbine;
   a source of compressed working fluid coupled with the multi-engine aircraft and operable to dispense compressed working fluid to the gas turbine engine;
   a valve coupled with the source of compressed working fluid and operable to permit passage of the compressed working fluid to the combustor of the gas turbine engine when the valve is operated; and
   wherein the valve is actuated to increase a mass flow through the gas turbine engine to boost power of the gas turbine engine during operation of the gas turbine engine,
   wherein the apparatus further includes a controller structured to actuate the valve in response to the first engine failing to provide a commanded level of thrust,
   wherein the compressed working fluid is air,
   wherein the source of compressed working fluid is a pressurized tank, and
   wherein the apparatus further includes a pump driven via a gearing powered by the gas turbine engine and the pump is configured to provide the compressed working fluid to the pressurized tank.

6. The apparatus of claim 5, wherein the controller is further structured to actuate the valve in response to receiving a signal from a pilot interface.

7. The apparatus of claim 5, wherein the controller is operable to cause a delivery of a first quantity of fuel to be burned in the combustor of the gas turbine engine before the valve is actuated and to further cause a delivery of a second quantity of fuel to be burned in the combustor of the gas turbine engine after the valve is actuated, wherein the second quantity of fuel is greater than the first quantity of fuel.

8. An apparatus comprising:
   an aircraft having a first engine and a second engine, the first engine and the second engine operable to produce power for the aircraft by combusting a mixture of a compressed working fluid and a fuel;
   an engine power supplement device configured to increase the power from the first engine, the engine power supplement device including a vessel having a compressed supplement fluid, the vessel configured to conduct the compressed supplement fluid to the first engine; and
   a controller configured to instruct the engine power supplement device to provide the compressed supplement fluid to the first engine to supplement the compressed working fluid in response to the second engine being in a degraded operating state,
   wherein the compressed supplement fluid is air, the apparatus further including a pump operable to pressurize the air to create the compressed supplement fluid and convey the compressed supplement fluid toward the vessel,
   wherein the pump is configured to be drive via a gearing, and
   wherein the gearing is configured to be driven by each of the first engine and the second engine.

9. The apparatus of claim 8, wherein the aircraft includes a flow path from the vessel to the first engine, the flow path providing the compressed supplement fluid to a combustor in which the mixture of the compressed working fluid and the fuel is combusted.

10. The apparatus of claim 9, wherein the first engine includes a port in an axially forward portion of the combustor.

\* \* \* \* \*